(12) United States Patent
Barcons-Palau et al.

(10) Patent No.: US 8,977,109 B2
(45) Date of Patent: Mar. 10, 2015

(54) HUMAN INTERACTION TRAJECTORY-BASED SYSTEM

(75) Inventors: Jesus Barcons-Palau, Sunnyvale, CA (US); Sitaram Bhagavathy, Palo Alto, CA (US); Joan Llach, Cesson-Sevign (FR); Dong-Qing Zhang, Plainsboro, NJ (US)

(73) Assignee: Thomson Licensing, Issy Les Moulineaux (FR)

( * ) Notice: Subject to any disclaimer, the term of this patent is extended or adjusted under 35 U.S.C. 154(b) by 0 days.

(21) Appl. No.: 13/516,228

(22) PCT Filed: Dec. 10, 2010

(86) PCT No.: PCT/US2010/003140
§ 371 (c)(1),
(2), (4) Date: Jun. 14, 2012

(87) PCT Pub. No.: WO2011/084130
PCT Pub. Date: Jul. 14, 2011

(65) Prior Publication Data
US 2012/0263437 A1    Oct. 18, 2012

Related U.S. Application Data

(60) Provisional application No. 61/284,261, filed on Dec. 16, 2009.

(51) Int. Cl.
*G11B 27/00*  (2006.01)
*H04N 5/93*  (2006.01)
(Continued)

(52) U.S. Cl.
CPC ........ *G06K 9/00711* (2013.01); *G06K 9/00335* (2013.01); *G06K 9/033* (2013.01);
(Continued)

(58) Field of Classification Search
USPC .................................................. 386/278–290
See application file for complete search history.

(56) References Cited

U.S. PATENT DOCUMENTS 6,579,190 B2 *   6/2003   Yamamoto ..................... 473/141
6,587,574 B1 *   7/2003   Jeannin ......................... 382/107
(Continued)

FOREIGN PATENT DOCUMENTS

| JP | 2002-99918 A   | 4/2002  |
| JP | 2004-326693 A  | 11/2004 |
| JP | 2009-104474 A  | 5/2009  |

OTHER PUBLICATIONS

X. Yu, C. Xu, Q. Tian, and H. Leong "A ball tracking framework for broadcast soccer video", In Proc. of IEEE International Conference on Multimedia & Expo (ICME), 2003.*
(Continued)

*Primary Examiner* — Hung Dang
(74) *Attorney, Agent, or Firm* — Robert D. Shedd; Richard LaPeruta

(57) ABSTRACT

A method and associated apparatus for using a trajectory-based technique to detect a moving object in a video sequence at incorporates human interaction through a user interface. The method comprises steps of identifying and evaluating sets of connected components in a video frame, filtering the list of connected components by comparing features of the connected components to predetermined criteria, identifying candidate trajectories across multiple frames, evaluating the candidate trajectories to determine a selected trajectory, eliminating incorrect trajectories through use of the interface and processing images in said video sequence responsive to the evaluating and eliminating steps.

16 Claims, 10 Drawing Sheets

(51) Int. Cl.
- G06K 9/00 (2006.01)
- G06K 9/03 (2006.01)
- G06T 7/20 (2006.01)

(52) U.S. Cl.
CPC .... *G06T 7/2033* (2013.01); *G06T 2207/10016* (2013.01); *G06T 2207/30228* (2013.01); *G06T 2207/30241* (2013.01)
USPC .......................................... 386/278; 386/282

(56) References Cited

U.S. PATENT DOCUMENTS

| | | | |
|---|---|---|---|
| 7,641,565 B2 * | 1/2010 | Kiraly | 473/151 |
| 2003/0048849 A1 | 3/2003 | Tomita, Jr. et al. | |
| 2005/0213818 A1 | 9/2005 | Suzuki et al. | |
| 2009/0060352 A1 | 3/2009 | Distante et al. | |
| 2009/0110366 A1 * | 4/2009 | Ogikubo et al. | 386/52 |
| 2009/0147992 A1 * | 6/2009 | Tong et al. | 382/103 |
| 2010/0169330 A1 | 7/2010 | Albers et al. | |
| 2010/0184496 A1 * | 7/2010 | Nicora et al. | 463/5 |
| 2011/0243417 A1 * | 10/2011 | Madabhushi et al. | 382/131 |
| 2014/0003666 A1 * | 1/2014 | Park et al. | 382/103 |

OTHER PUBLICATIONS

D. Liang, Y. Liu, Q. Huang, and W. Gao, "A scheme for ball detection and tracking in broadcast soccer video", In Proc. of IEEE Pacific-Rim Conference on Multimedia (PCM), 2005.*

F. Yan, A. Kotin, W. Christmas, J. Kittler, "A novel data association algorithm for object tracking in clutter with application to tennis video analysis", Proceedings of the 2006 IEEE Computer Society Conference on Computer Vision and Pattern Recognition, 2006.*

J. Li, T. Wang, W. Hu, M. Sun, Y. Zhang, "Soccer highlight detection using two-dependence Bayesian network", In Proc. of IEEE International Conference on Multimedia & Expo (ICME), 2006.*

Capson et al., "Microcomputer-Based Interactive Tacking of Blood Cells at Biomaterial Surfaces", IEEE Transactions on Biomedical Engineering, vol. 36, No. 8, Aug. 1, 1989, pp. 860-864.

Correia et al., "User Interaction in Content Based Video Coding and Indexing", EUSIPCO, Rhodes, GR, 1998, pp. 1-4.

Liang et al., "Video2Cartoon: A System for Converting Broadcat Soccer Video into 3D Carton Animation", IEEE Transactions on Consumer Electronics, vol. 43, No. 3, Aug. 1, 2007, New York, NY, pp. 1138-1145.

Pallavi et al., "Ball Detection from Broadcast Soccer Videos Using Static and Dynamic Features", Journal of Visual Communication and Image Representation, vol. 19, No. 7, Oct. 1, 2008, pp. 426-436.

Ren et al., "Tracking the Soccer Ball Using Multiple Fixed Cameras", Computer Vision and Image Understanding, vol. 113, No. 5, May 1, 2009, pp. 633-642.

Wei et al., "Interactive Offline Tracking For Color Objects", Computer Vision, 2007, ICCV 2007, IEEE 11th Intenational Conference, PI, Oct. 1, 2007, pp. 1-8.

Yu et al., "Trajectory-Based Ball Detection and Tracking in Broadcast Soccer Video", IEEE Transactions on Multimedia, vol. 8, No. 6, Dec. 1, 2006, pp. 1164-1178.

Orazio et al., "A Semi-Automatic System for Ground Truth Generation of Soccer Video Sequences", 2009 Advanced Video and Signal Based Surveillance, IEEE Computer Society, 2009 IEEE, 6 pages.

Choi et al., "Tracking Soccer Ball in TV Broadcast Video", 8 pages.

Search Report dated: May 12, 2011, for PCT/US2011/003140.

* cited by examiner

200

210

220

230

240

250

HUMAN INTERACTION TRAJECTORY-BASED SYSTEM

CROSS-REFERENCE TO RELATED APPLICATIONS

This application claims the benefit, under 35 U.S.C. §365 of International Application PCT/US2010/003140, filed Dec. 10, 2010, which was published in accordance with PCT Article 21(2) on Jul. 14, 2011 in English and which claims the benefit of U.S. provisional patent application No. 61/284,261, filed Dec. 16, 2009.

FIELD OF THE INVENTION

The invention is related to trajectory-based detection system in video sequences.

BACKGROUND OF THE INVENTION

As mobile devices have become more capable and mobile digital television standards have developed, it has become increasingly practical to view video programming on such devices. The small screens of these devices, however, present some limitations, particularly for the viewing of sporting events. Small objects, such as the ball in a sports program, can be difficult to see. The use of high video compression ratios can exacerbate the situation by significantly degrading the appearance of small objects like a ball, particularly in a far-view scene.

It can therefore be desirable to apply image processing to enhance the appearance of the ball. However, detecting the ball in sports videos or videos with other small moving objects is a challenging problem. For instance, the ball can be occluded or merged with field lines. Even when it is completely visible, its properties, such as shape, area, and color, may vary from frame to frame. Furthermore, if there are many objects with ball-like properties in a frame, it is difficult to make a decision as to which is the ball based upon only one frame, and thus difficult to perform image enhancement.

Previous methods of detecting and tracking moving objects such as soccer balls and the like have been developed which are fairly robust and accurate. Such a method is disclosed in PCT/US10/002039.

However, previous methods can fail in some situations. Examples of failure include not tracking the desired object such as a ball or tracking another object that is not the desired object.

As such, a need exist to provide an improved method of detecting and tracking moving objects which overcome the deficiencies of the prior art.

SUMMARY OF THE INVENTION

In order to solve the problems described above, the present invention concerns A method and associated apparatus for using a trajectory-based technique to detect a moving object in a video sequence at incorporates human interaction through a user interface. The method comprises steps of identifying and evaluating sets of connected components in a video frame, filtering the list of connected components by comparing features of the connected components to predetermined criteria, identifying candidate trajectories across multiple frames, evaluating the candidate trajectories to determine a selected trajectory, eliminating incorrect trajectories through use of the interface and processing images in said video sequence responsive to the evaluating and eliminating steps.

BRIEF DESCRIPTION OF THE DRAWINGS

The invention will now be described by way of example with reference to the accompanying figures of which.

DETAILED DESCRIPTION OF THE EMBODIMENTS

A key aspect of the invention is to improve the performance of the object detection system by using minimal input from a human or another source of reliable information.

The goal of a trajectory-based detection system is to generate a set of trajectories $BT \subseteq T$, likely to represent the path of the actual object. $T = \{T_1, T_2, \ldots, T_M\}$ is the set of all the candidate trajectories, where each candidate trajectory $T_i\{C_1^i, C_2^i, \ldots, C_N^i\}$ is a set of candidates in contiguous frames forming a viable hypothesis of a smoothly moving object in a certain time interval, wherein there is one candidate per frame. A candidate is an object in a particular frame likely to be the ball or object of interest. (It should be noted that candidates can also be referred to as alternates.) The set of all the candidates is called C, and the candidate $C_k^i$ is the k-th element of the trajectory $T_i$.

A method to create BT can be an algorithm which iteratively takes the trajectory from T with the highest confidence index $\Omega(T_i)$ which is computed based on the elements that make up the trajectory $T_i$ and moves it to set BT. Then all the trajectories in T with certain degree of incompatibility with BT are trimmed or deleted. The algorithm stops when there are no more trajectories in T.

Figure 1:
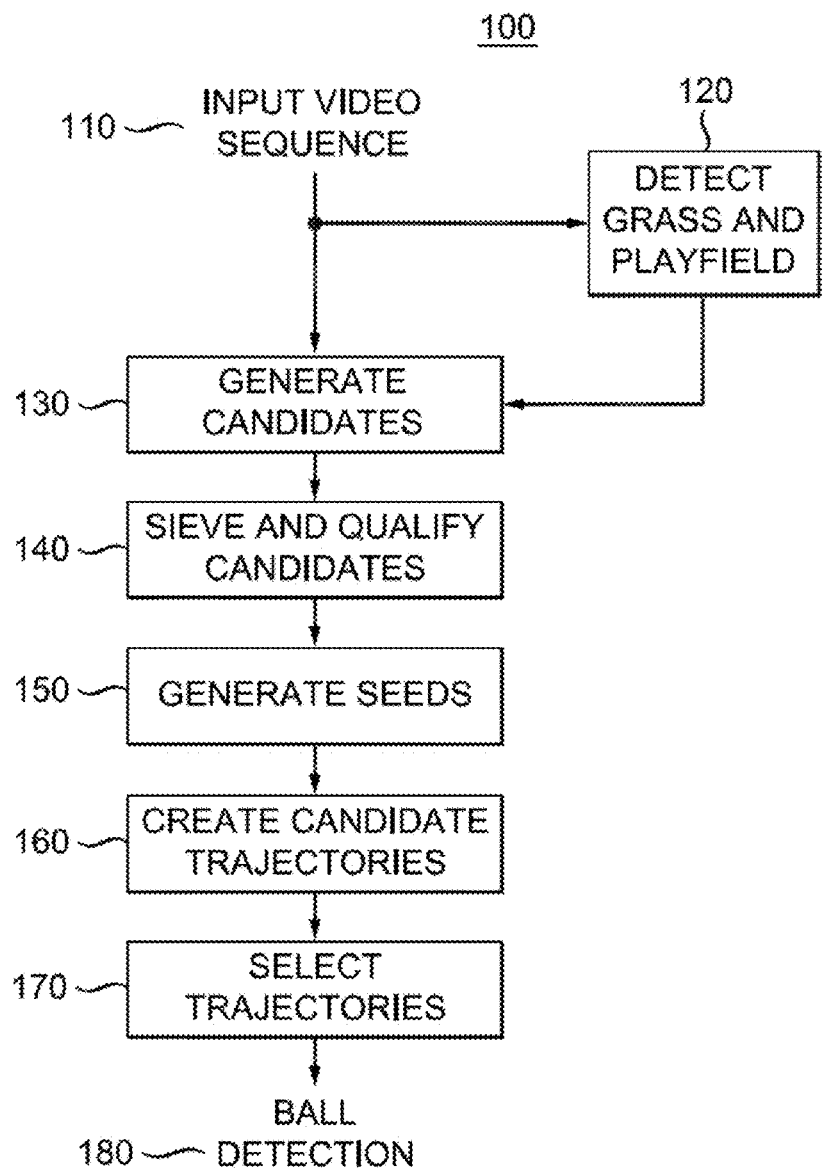
FIG. 1 is a general flowchart of a trajectory-based ball detection method according to the invention.

FIG. 1 is a flowchart of one embodiment of a trajectory-based ball detection method 100 employed by the invention. The method may be applied to an input video sequence 110, which may be a sporting event such as a soccer game.

At step 120, a playfield mask PM is generated. The mask generation comprises detecting the grass regions to generate a grass mask GM and then computing the playfield mask, which is the holes-free area covering these grass regions.

At step 130, candidate objects that may be the ball are detected. Local maxima are detected in the intensity image by convolving the luminance component Y of the frame F with a normalized Gaussian kernel $G_{nk}$, generating the output image $Y_{conv}$. A pixel (x,y) is designated as a local maximum if $Y(x,y) > Y_{conv}(x,y) + T_{lmax}$, where $T_{lmax}$ is a preset threshold. This approach succeeds in isolating ball pixels, but also isolates some parts of the players, field lines, goalmouths, etc., since these features also contain bright spots which can be local maxima. The final result is a binary image $I_{lm}$ with 1's denoting bright spots. The set of connected components $Z=\{Z_1, Z_2, \ldots, Z_n\}$ in $I_{lm}$ are termed "candidates," which are processed in the next step to detect "ball candidates." In an embodiment, $G_{nk}$ is a 9×9 Gaussian kernel with variance 4 and the threshold $T_{lmax}$ is 0.1.

Information from the playfield detection of step 120 may be used at step 130 and step 140 to reduce the number of candidates. In far-view scenes, the assumption can be made that the ball will be inside the playfield, and that objects outside the playfield may be ignored.

Figure 2:
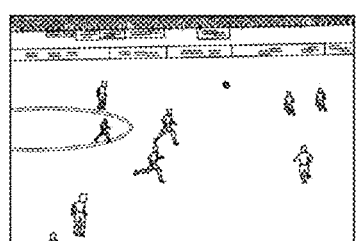
FIG. 2 is an illustration of the process of generating a playfield mask and identifying ball candidates.
Figure 2:
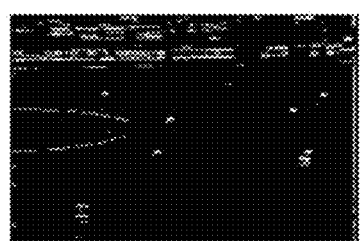
Figure 2:
Figure 2:
Figure 2:
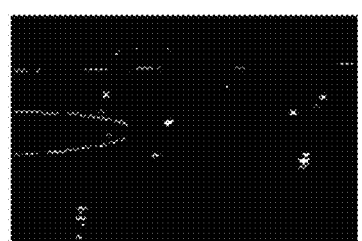

FIG. 2 provides a graphical illustration of the process used for the detection of candidates. Given a frame 210, the soccer field pixels are identified using the knowledge that the field is made of grass. The result of the process is a binary mask 230 classifying all field pixels as 1 and all non-field pixels, including objects in the field, as 0. The soccer field area $A_{field}$ is computed as the number of pixels within the field boundaries, shown in image 240, including the non-field objects. The result of the candidate detection is shown in image 220. Candidates not within the field area are eliminated, resulting in image 250.

Some of the candidates from step 130 are very unlikely to be the ball and may be eliminated using a sieving and qualification process at step 140. A score is computed for each candidate, providing a quantification of how similar each is to a pre-established model of the ball.

Some of the candidates can be eliminated using statistical information of the ball features. In an embodiment, three features of the ball are considered:

Area (A), is the number of pixels in a candidate $Z_i$.

Eccentricity (E), is a measure of "elongatedness". The more elongated an object is, the higher the eccentricity. In an embodiment one can use binary image moments to compute the eccentricity.

Whiteness (W), is the quality of a pixel of being white. Given the r, g and b (red, green and blue components respectively) of a given pixel, the whiteness can be defined as:

$$W = \sqrt{\left(\frac{3r}{r+g+b}-1\right)^2 + \left(\frac{3b}{r+g+b}-1\right)^2}$$

Analysis of sample video has shown that both area and whiteness histograms follow a Gaussian distribution. The eccentricity histogram also follows a Gaussian distribution after a symmetrization to account for the minimum value of eccentricity being 1. Candidates can be rejected if their feature values lie outside the range $\mu \pm n\sigma$, where $\mu$ is the mean and $\sigma$ is the standard deviation of the corresponding feature distribution. Based on this sieving process S, candidates in Z can be accepted or rejected as a ball-like object. A loose range is used, because the features of the ball could vary significantly from frame to frame.

Area A can be modeled as a Gaussian distribution with $\mu_A = 7.416$ and $\sigma_A = 2.7443$, and the range is controlled by $n_A = 3$. E is modeled as a Gaussian distribution with $\mu_E = 1$ and $\sigma_E = 1.2355$, and the range is controlled by $n_E = 3$. W is modeled as a Gaussian distribution with $\mu_W = 0.14337$ and $\sigma_W = 0.034274$, and the range is controlled by $n_W = 3$. Candidates must meet all three criteria to be kept.

Also in step 140, the candidates C that pass the sieving process S(Z) are qualified based on the similarity of their features with a pre-established model of the ball. A, E, and W are used again to compute scores for the ball candidates, but a tighter value of n is used, in addition to:

Distance to the closest candidate (DCC), the closest distance in pixels between any of the pixels in a candidate $C_i$ with all the other pixels in the other candidates $\{C - C_i\}$, Distance to the edge of the field (DF), the closest distance in pixels between the center of a given candidate and the perimeter of the playfield mask PM, and Number of candidates inside the respective blob in the object mask (NCOM), the number of candidates in C lying inside the same connected component in the object mask OM as a given candidate $C_i$, wherein OM, the object mask, is a binary mask indicating the non-grass pixels inside the playfield and is defined as the inversion of GM inside PM.

The ball can be expected to be an isolated object inside the playfield most of the time, in contrast to objects like the socks of players, which are always close to each other. Hence, candidates without a close neighbor, and with a high DCC, are more likely to be the ball. Likewise, the ball is also not expected to be near the boundaries of the field. This assumption is especially important if there are other spare balls inside the grass but outside the bounding lines of the playfield.

OM provides information about which pixels inside the playfield are not grass. This includes players and field lines, which may contain "ball-like" blobs inside them (e.g., socks of players or line fragments). Ideally, ball candidates should not lie inside other larger blobs. As can be expected only one candidate $C_i$ inside a connected component of the OM, $NCOM_i$ is expected to be 1 in our ideal model. Thus one can benefit from computing NCOM.

A score $S_i$ for a candidate $C_i$ is computed as:

$$S_i = S_{A,i} + S_{E,i} + S_{W,i}$$

where:

$$S_{A,i} = \begin{cases} 1 & \text{if } \mu_A - n_A\mu_A < A_i < \mu_A + n_A\mu_A \\ 0 & \text{otherwise} \end{cases}$$

$$S_{E,i} = \begin{cases} 1 & \text{if } \mu_E - n_E\mu_E < E_i < \mu_E + n_E\mu_E \\ 0 & \text{otherwise} \end{cases}$$

$$S_{W,i} = \begin{cases} 1 & \text{if } \mu_W - n_W\mu_W < W_i < \mu_W + n_W\mu_W \\ 0 & \text{otherwise} \end{cases}$$

At this point, candidates having a score equal to 0 are rejected. For the remaining candidates, the score $S_i$ is penalized using the other features as follow:

$$S_i = \begin{cases} S_i & \text{if } DCC_i \leq DCR_{thr} \\ 1 & \text{otherwise} \end{cases}$$

$$S_i = \begin{cases} S_i & \text{if } DF_i \leq DF_{thr} \\ 1 & \text{otherwise} \end{cases}$$

$$S_i = \begin{cases} S_i & \text{if } NCOM_i > NCOM_{thr} \\ 1 & \text{otherwise} \end{cases}$$

In an embodiment, $\mu_A=7.416$, $\sigma_A=2.7443$, $n_A=1.3$; $\mu_E=1$, $\sigma_E=1.2355$, $n_E=1.3$; $\mu_W=0.14337$, $\sigma_W=0.034274$, $n_W=1.3$; $DCC_{thr}=7$ pixels, $DF_{thr}=10$ pixels and $NCOM_{thr}=1$.

Figure 3:
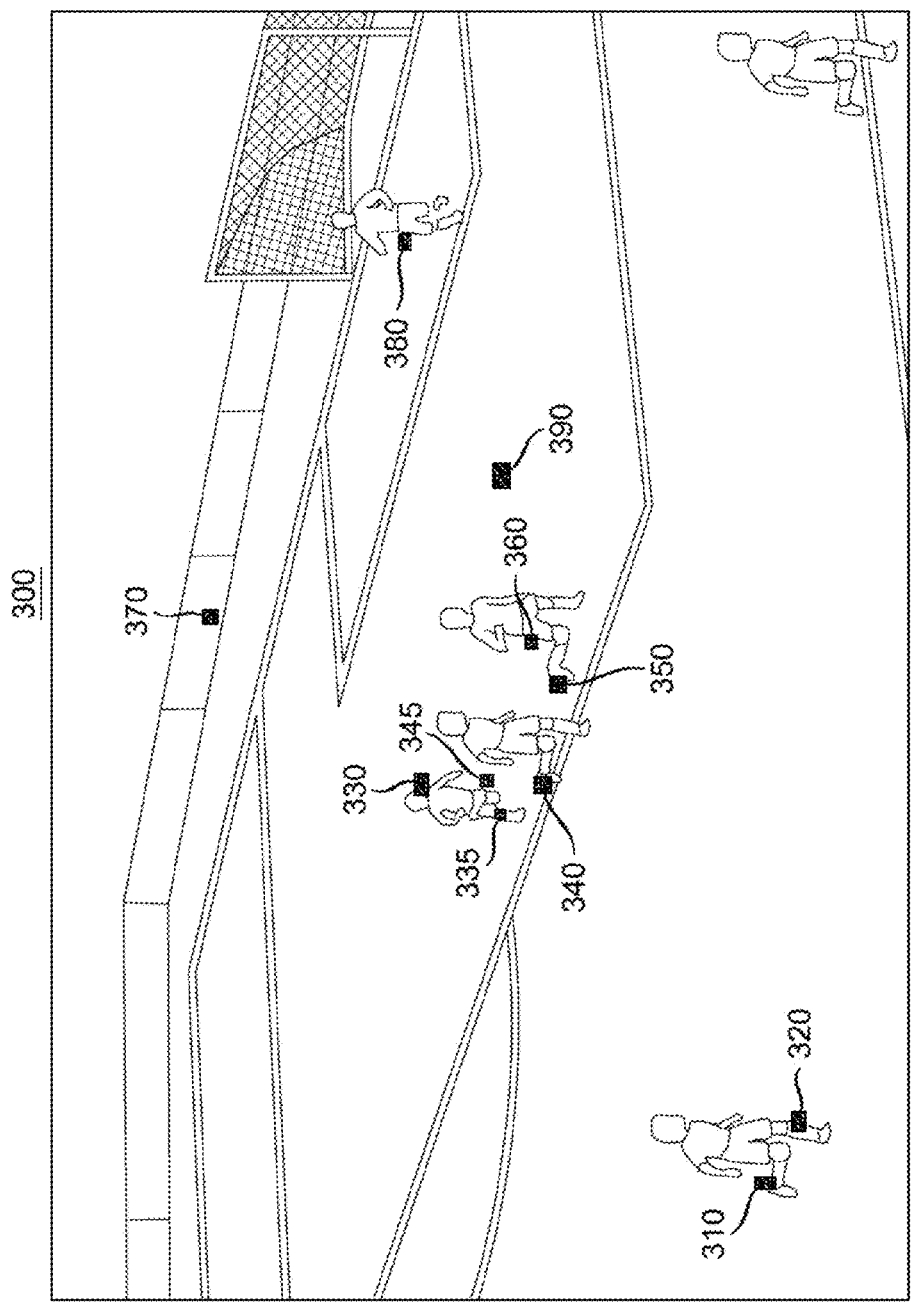
FIG. 3 is an illustration of ball candidates in a video frame.

FIG. 3 illustrates the result of identification of ball candidates in a frame, with bounding boxes (for ball candidates 310-390) indicating the presence of a ball candidate. Different colors are presented in the interface that represent the scores of the candidates. Red, green, and blue represent scores of 3, 2, and 1, respectively. In FIG. 3, the candidate 390 is red (i.e. score 3), the candidate 350 is green (i.e. score 2), and the remaining candidates are blue (i.e. score 1). In this illustration, candidates 310, 320, 335, 340, 360, and 380 represents parts of players or their attire, candidates 330 and 370 represent other objects on the field, and 390 represents the actual ball.

At step 150, starting points of trajectories, or "seeds," are identified. A seed $SEED_k$ is a pair of ball candidates $\{C_i, C_j\}$ in two consecutive frames $F_t$, $F_{t+1}$, where $C_i$ belongs to $F_t$ and $C_j$ belongs to $F_{t+1}$, such that the candidates of the pair $\{C_i, C_j\}$ are spatially closer to each other than a threshold value $SEED_{thr}$, and furthermore meet either the criteria that the score of one candidate is three, or that the score of both candidates is two. In a preferred embodiment, $SEED_{thr}=8$ pixels. Criteria may be altered to address other concerns, such as time complexity.

At step 160, candidate trajectories are created from the seeds from step 150. A trajectory $T_i=\{C_1^i, C_2^i, \ldots, C_N^i\}$ is defined as a set of candidates in contiguous frames, one per frame, forming a viable hypothesis of a smoothly moving object in a certain time interval or frame range generated using the seed $SEED_i$.

A linear Kalman filter is used to create the trajectories by growing the seed in both directions. The two samples that compose the seed determine the initial candidate in the next frame. If there is a candidate in the next frame inside a search window centered at the predicted position, the candidate nearest to the predicted position is added to the trajectory and its position is used to update the filter. If no candidate is found in the window, the predicted position is added to the trajectory as an unsupported point and is used to update the filter. A trajectory building procedure is terminated if a) there are no candidates near the predicted positions for N consecutive frames, and b) there are more than K candidates near the predicted position (e.g., K=1). The filter works in a bidirectional manner, so after growing the trajectory forward in time, the Kalman filter is re-initialized and grown backward in time. The first criterion to terminate a trajectory produces a set of unsupported points at its extremes. These unsupported points are then eliminated from the trajectory.

Figure 4:
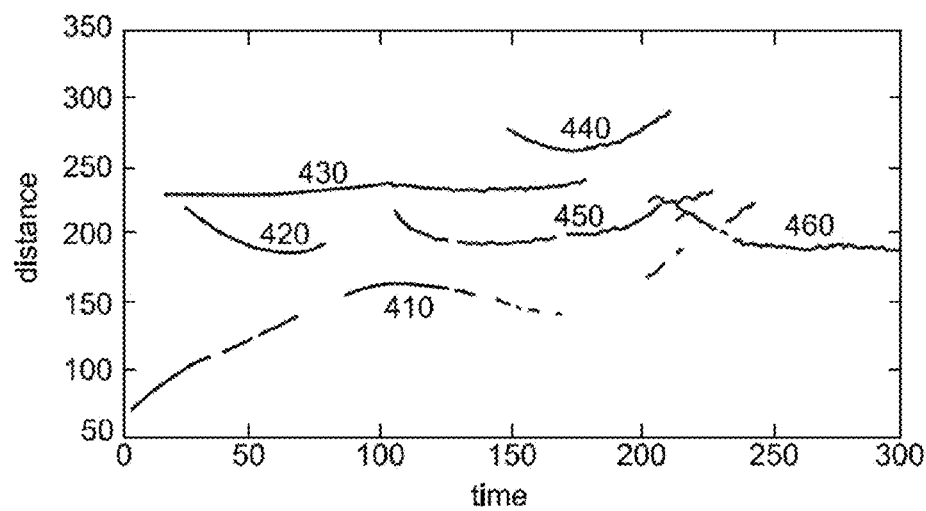
FIG. 4 is a plot of example candidate trajectories.

FIG. 4 illustrates a plot 400 of candidate trajectories 410-460 created using the method above. The x-axis represents the time in frames. The y-axis is the Euclidean distance between the potential ball and the top left pixel of the image. Multiple colors are used to illustrate different candidate trajectories.

Some of the candidate trajectories $T=\{T_1, T_2, \ldots, T_M\}$ may be parts of the path described by the actual ball, while others are trajectories related to other objects. The goal of the algorithm is to create a trajectory BT by selecting a subset of trajectories likely to represent the path of the actual ball, while rejecting the others. The algorithm comprises the use of a trajectory confidence index, a trajectory overlap index, and a trajectory distance index. A score for each trajectory is generated based on the length of the trajectory, the score of the candidates that compose the trajectory, and the number of unsupported points in the trajectory.

A confidence index is computed as:

$$\Omega(T_j) = \sum_{i=1}^{3} \lambda_i p_i + \sum_{i=2}^{3} \omega_i q_i - \tau r$$

where:

$\Omega(T_j)$ is the confidence index for the trajectory $T_j$, $p_i$ is the number of candidates in $T_j$ with score "i", $q_i = p_i/|T_j|$, where $|T_j|$ is the number of candidates in the trajectory, denotes the fractions of candidates with score "i" in the trajectory, $\lambda_i$ and $\omega_i$ ($\lambda_1 < \lambda_2 < \lambda_3$ and $\omega_2 < \omega_3$) adjust the importance of the components, r is the number of unsupported points in the trajectory, and $\tau$ is the importance factor for the unsupported points. In an embodiment $\lambda_1=0.002$, $\lambda_2=0.2$, $\lambda_3=5$, $\omega_2=0.8$, $\omega_3=2$ and $\tau=10$.

For each selected trajectory, there may be others that overlap in time. If the overlap index is high, the corresponding trajectory will be discarded. If the index is low, the overlapping part of the competing trajectory will be trimmed.

This overlap index penalizes the number of overlapping frames while rewarding long trajectories with a high confidence index, and is computed as:

$$\chi(T_i, T_j) = \frac{\rho(T_i, T_j)}{|T_i| \times \Omega(T_i)}$$

where:

$\chi(T_i, T_j)$ is the overlapping index for the trajectory $T_i$ with the trajectory $T_j$, $\rho(T_i, T_j)$ is the number of frames in which $T_i$ and $T_j$ overlap, and $\omega(T_i)$ is the confidence index for the trajectory $T_i$.

The use of the trajectory distance index increases the spatial-temporal consistency of BT. Using the assumption that the ball moves at a maximum velocity $V_{max}$ pixels/frame, two trajectories BT and $T_i$ are incompatible if the spatial distance of the ball candidates between the closest extremes of the trajectories is higher than $V_{max}$ times the number of frames between the extremes plus a tolerance D. Otherwise, they are compatible and $T_i$ can be part of BT.

The distance index is given by:

$$DI(BT, T_i) = \begin{cases} 1 & \text{if } CPD(BT, C_1^i) < (\text{frame}(C_1^i) - CPF(BT, C_1^i)) \times V_{max} + D \text{ and} \\ & CND(BT, C_N^i) < (CNF(BT, C_N^i) - \text{frame}(C_N^i)) \times V_{max} + D \\ 0 & \text{otherwise} \end{cases}$$

where:

$$CPD(BT, C_j) = \begin{cases} dist(pos(BT_i), pos(C_j)) \mid \text{frame}(BT_i) = & \text{if } CPF(BT, C_j) \neq -1 \\ CPF(BT, C_j) \\ -1 & \text{otherwise} \end{cases}$$

$$CND(BT, C_j) = \begin{cases} dist(pos(BT_i), pos(C_j)) \mid \text{frame}(BT_i) = & \text{if } CNF(BT, C_j) \neq -1 \\ \text{if } CNF(BT, C_j) \neq -1 \\ -1 & \text{otherwise} \end{cases}$$

$$CPD(BT, C_j) = \begin{cases} \max(i) \mid \text{frame}(BT_i) < \text{frame}(C_j) \\ -1 \text{ otherwise} \end{cases}$$

$$CNF(BT, C_j) = \begin{cases} \max(i) \mid \text{frame}(BT_i) > \text{frame}(C_j) \\ -1 \text{ otherwise} \end{cases}$$

$$T_i = \{C_1^i, C_2^i, \cdots, C_N^i\}$$

and where:

dist(pos($C_i$), pos($C_j$)) is the Euclidean distance between the position of the candidates $C_i$ and $C_j$, frame($C_j$) is the frame to which the candidate $C_j$ belongs, pos(C) is the (x,y) position of the center of the candidate C inside the frame, $BT_i$ is the i-th candidate in BT, CPD stands for Closest Previous Distance, CND stands for Closest Next Distance, CPF stands for Closest Previous Frame, and CNF stands for Closest Next Frame.

If DI(BT, $T_i$)=1, then the trajectory $T_i$ is consistent with BT. Without this criterion, adding $T_i$ to BT can present the problem of temporal inconsistency, where the ball may jump from one spatial location to another in an impossibly small time interval. By adding the distance index criterion in the trajectory selection algorithm, this problem is solved. In a preferred embodiment, $V_{max}$=10 pixels/frame and D=10 pixels.

Two trajectory selection algorithms were implemented and tested. The first iteratively chooses the candidate trajectory with highest confidence index and removes or trims the trajectories incompatible with the chosen one. The second algorithm tries to solve this problem by formulating it as a shortest-path problem. The two algorithms can be tuned to have comparable performance.

Given T, the set of candidate trajectories, the algorithm produces as output BT, a subset of candidate trajectories that describe the trajectory of the ball along the video sequence. The algorithm iteratively takes the trajectory from T with the highest confidence index and moves it to BT. Then, all the trajectories in T overlapping with BT are processed, trimming or deleting them depending on the overlapping index χ(BT, $T_i$) and the distance index DI(BT,$T_i$). The algorithm stops when there are no more trajectories in T.

The algorithm can be described as follows:

```
BT = empty set
while (T not empty) do
    H = trajectory with highest confidence index from T
    Add H to BT
    Remove H from T
    for i = 1 to length(T) do
        if (χ(BT ,T_i) < O_thr) then
            trim(BT, T_i)
        else
            Remove T_i from T
    for i = 1 to length(T) do
        if (DI(BT, T_i) = 0) then
            Remove T_i from T
```

The trim operation trim(BT, $T_i$) consists of removing from the trajectory $T_i$ all candidates lying in the overlapping frames between BT and $T_i$. If this process leads to temporal fragmentation of $T_i$ (i.e., candidates are removed from the middle), the fragments are added as new trajectories to T and $T_i$ is removed from T. In a preferred embodiment, the overlap index threshold $O_{thr}$=0.5 is used.

Figure 5:
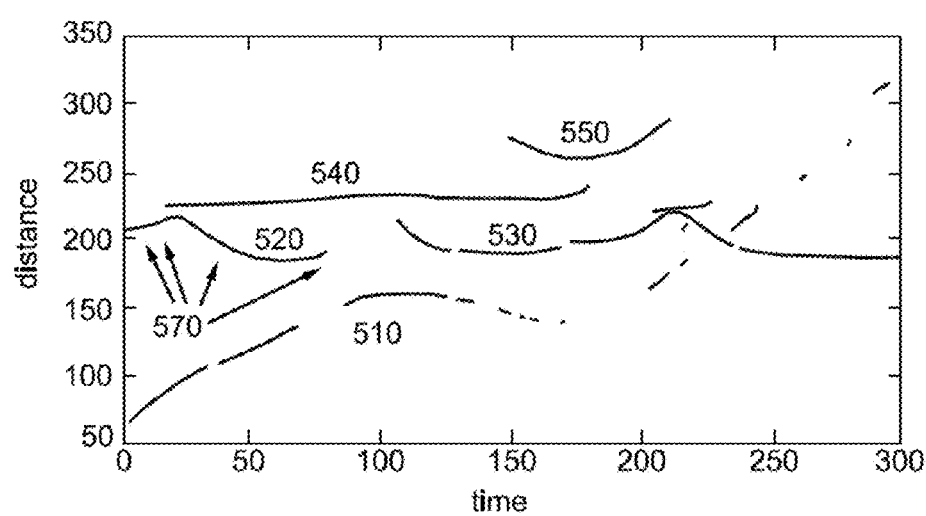
FIG. 5 is a plot of example candidate trajectories and the actual ball trajectory.

FIG. 5 is a plot 500 of a set of candidate trajectories 510-550, wherein some are the actual ball trajectory. The x-axis represents the time in frames. The y-axis is the Euclidean distance between the ball and the top left pixel of the image. Trajectories 520 and 530 are selected by the algorithm to describe the trajectory of the ball and are the actual ball trajectories. Trajectories 510, 540, and 550 are rejected by the algorithm. The ellipse portions 570 represent the actual path of the ball. For this example, it can be seen that the trajectory selection algorithm provided a highly accurate estimate of the real ball trajectory.

Another method to create the final ball trajectory is based on Dijkstra's shortest path algorithm. The candidate trajectories are seen as nodes in a graph. The edge between two nodes (or trajectories) is weighted by a measure of compatibility between the two trajectories. The reciprocal of the compatibility measure can be seen as the distance between the nodes. If the start and end trajectories ($T_s$, $T_e$) of the entire ball path are known, the trajectories in between can be selected using Dijkstra's algorithm which finds the shortest path in the graph between nodes $T_s$ and $T_e$ by minimizing the sum of distances along the path.

As a first step, a compatibility matrix containing the compatibility scores between trajectories is generated. Let N be the number of candidate trajectories. The cell (i, j) of the N×N compatibility matrix contains the compatibility score between the trajectories $T_i$ and $T_j$.

If two trajectories $T_i$ and $T_j$ overlap by more than a certain threshold or $T_i$ ends after $T_j$, the compatibility index between them will be infinite. By enforcing that $T_i$ ends after $T_j$, one can ensure that the path always goes forward in time. Note that this criterion means that the compatibility matrix is not symmetric, as $\Phi(T_i, T_j)$ need not be the same as $\Phi(T_j, T_i)$. If the overlapping index between $T_i$ and $T_j$ is small, the trajectory with lower confidence index will be trimmed for purposes of computing the compatibility index. The compatibility index between the two trajectories is defined as:

$$\Phi(T_i, T_j) = \frac{1}{\left(1 - e^{\alpha \times (\Omega(T_i) + \Omega(T_j))}\right)\left(e^{\beta \times \max(0, sdist(T_i, T_j) - V_{max} \times tdist(T_i, T_j))}\right)\left(e^{\gamma \times (tdist(T_i, T_j) - 1)}\right)}$$

where:

$\Phi(T_i, T_j)$ is the compatibility index between the trajectories $T_i$ and $T_j$, $\Omega(T_i)$ is the confidence index of the trajectory $T_i$, sdist($T_i$, $T_j$) is the spatial distance in pixels between the candidates at the end of $T_i$ and at the beginning of $T_j$, tdist($T_i$, $T_j$) is the time in frames between the end of $T_i$ and the beginning of $T_j$, and α, β and γ(all<0) are the relative importance of the components. In a preferred embodiment, α=−1/70, β=−0.1 and γ=−0.1.

Once the compatibility matrix is created, Dijkstra's shortest path algorithm can be used to minimize the distance (i.e., the reciprocal of compatibility) to travel from one trajectory node to another. If the start and end trajectories ($T_s$, $T_e$) of the entire ball path are known, the intermediate trajectories can be found using the shortest path algorithm.

However, $T_s$ and $T_e$ are not known a priori. In order to reduce the complexity of checking all combinations of start and end trajectories, only a subset of all combinations is considered, using trajectories with a confidence index higher than a threshold. Each combination of start and end trajectories (nodes) is considered in turn and the shortest path is computed as described earlier. Finally, the overall best path among all these combinations is selected.

The best ball path will have a low cost and be temporally long, minimizing the function:

$$SC(Q) = w \times (CD(Q)/\max\_c) + (1-w) \times ((1-\text{length}(Q))/\max\_l)$$

where:
Q is a subset of trajectories from T (ball path) constructed using the shortest path algorithm from an initial trajectory $T_i$ to a final trajectory $T_j$,
SC(Q) is a score for Q,
CD(Q) is the cost for going from the initial trajectory $T_i$ to the final trajectory $T_j$ passing through the trajectories in Q,
length(Q) is the length of the trajectory set Q in time (i.e. number of frames covered by Q including the gaps between trajectories),
max_c and max_l are the maximum cost and maximum length among all shortest paths constructed (one for each combination of start and end trajectories), and
w is the relative importance of cost vs. length.

In a preferred embodiment, w=0.5.

One way of improving the results of the algorithm is to allow the user to manipulate the confidence index of the trajectories. By doing this, the algorithm can be guided to generate a better selection of trajectories to create BT.

Unfortunately the user cannot guarantee that a trajectory contains the ball just by the shape of the trajectory, and on the other hand, going frame by frame to check if the candidate that has been selected by the algorithm is actually the ball can be tedious for the user.

One of the benefits of working at the level of trajectories instead of dealing directly with candidates is that the cardinality of the set of trajectories in BT is always lower that the cardinality of the set of candidates in it. Besides, in high likelihood, the candidates forming a given trajectory correspond to the same object. Using these two assumptions, only one frame with its selected candidate for the trajectories that compose BT can be sufficient for the user to quickly notice if the trajectories in BT have been properly selected and take corrective measures if not.

It is important to notice that the element of interaction for the user is a candidate and not a trajectory. So, the user can classify a candidate as a good candidate (being the ball) or wrong candidate (not being the ball).

Let $C_g$ be a good candidate and $C_w$ a wrong candidate. Then, $T_g = \{T_i \subseteq T | C_g \in T_i\}$ and $T_w = \{T_i \subseteq T | C_w \in T_i\}$ are respectively the set of trajectories containing the good candidate and the wrong candidate.

Ultimately the goal of classifying candidates as $C_g$ and $C_w$ is to generate BT containing trajectories from $T_g$ but not from $T_w$. Hence, the algorithm to generate BT can be modified in several ways in order to take advantage of the classified candidates. The following are examples of such modifications.

Clearly, it is desirable to have the trajectories from $T_g$ to be part of BT, so an option to accomplish this is to give to the trajectories $T_g$ a higher confidence index than the other trajectories in T. The written algorithm above iteratively takes the trajectory from T with the highest confidence index.

Figure 6:
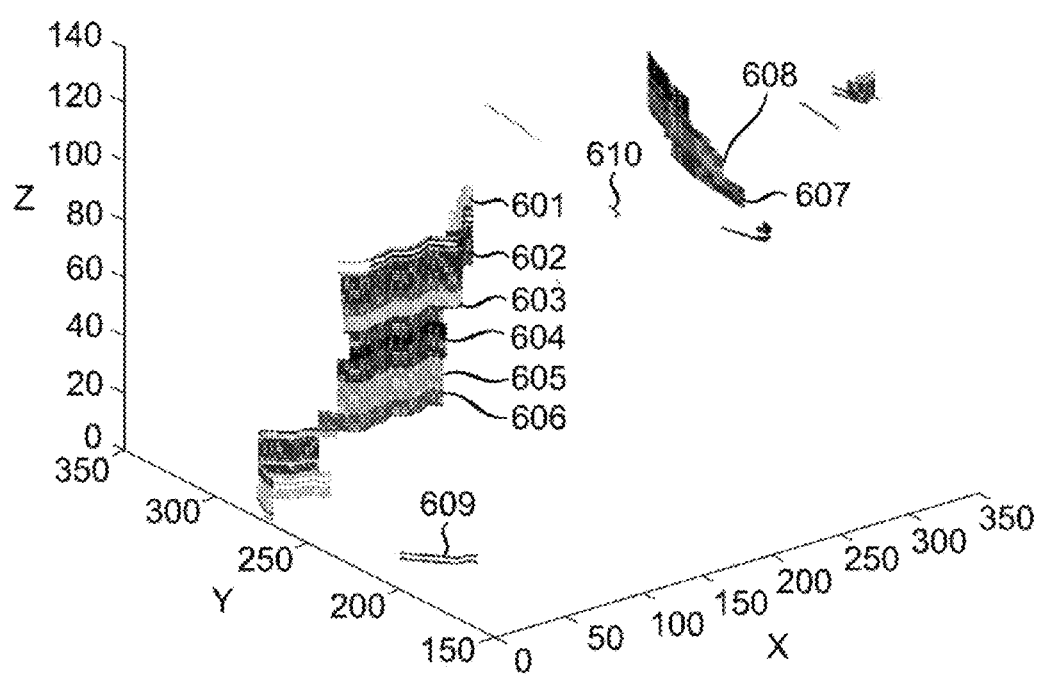
FIG. 6 is a 3-dimensional plot of example candidate trajectories to show differentiation between candidates and show how a given candidate can be present among many candidate trajectories.

One way of pursuing this is by giving to $T_g$ a new confidence index greater than the maximum in T. Even though this will work, it is not the best option, because now all the trajectories $T_g$ have the same confidence index and it is not possible to decide which one is the best among them. It is important to bear in mind that there are several trajectories that can share a good candidate. See FIGS. 6 and 7. FIG. 6 shows a set of candidate trajectories T. The X-axis represents the time in frames. The Y-axis is the Euclidean distance between a candidate and top left pixel of the image. The Z-axis is used to show the different trajectories. It is important to notice that the candidate trajectories usually overlap. Different levels of shading are used to differentiate the trajectories. There are a number of trajectories shown in FIG. 6. For example, the shaded bands 601 through 610 are each a set of trajectories with each narrow line being a given candidate trajectory.

Figure 7:
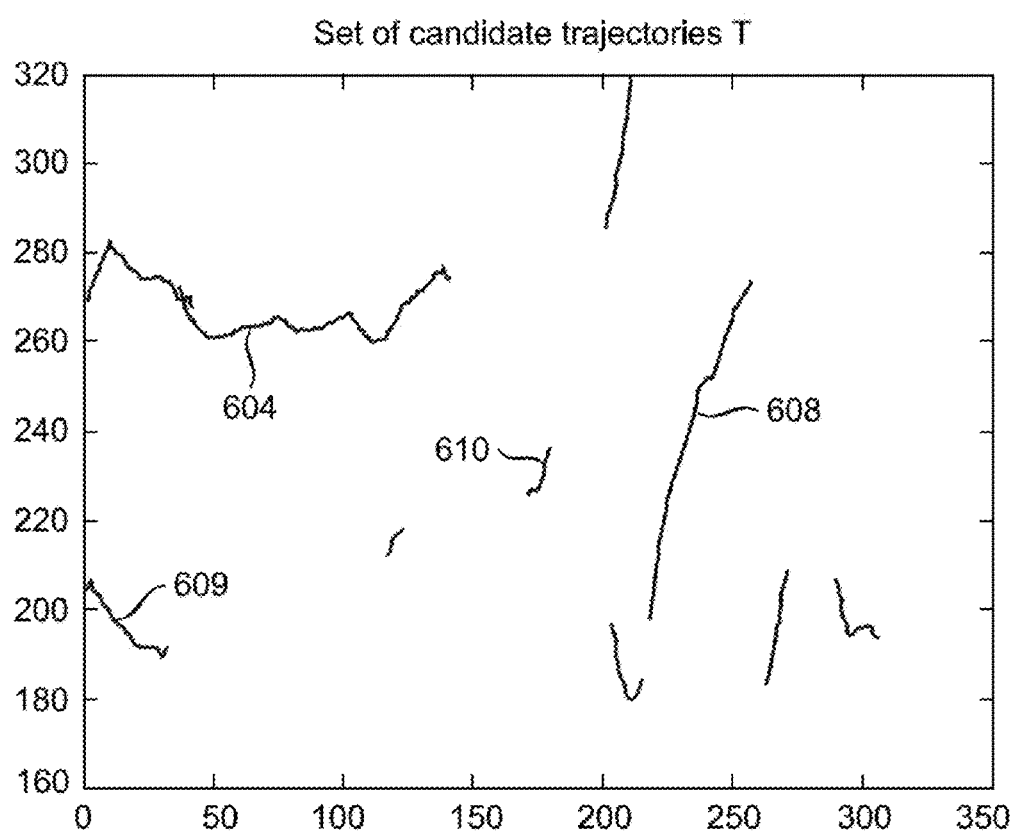
FIG. 7 is a plot of example candidate trajectories of FIG. 6 from a different point of view.

FIG. 7 is a two dimensional representation of a set of candidate trajectories T. The X-axis represents the time in frames. The Y-axis is the Euclidean distance between a candidate and top left pixel of the image. Some of the trajectories in FIG. 6 are pointed out in FIG. 7.

A preferred option is to add a positive bias K to their confidence index. By doing this, the trajectories in $T_g$ will compete among themselves, because their previous confidence index will decide which one will be the first choice for BT. The bias K can be set as the maximum confidence index in T or a higher value.

Figure 8:
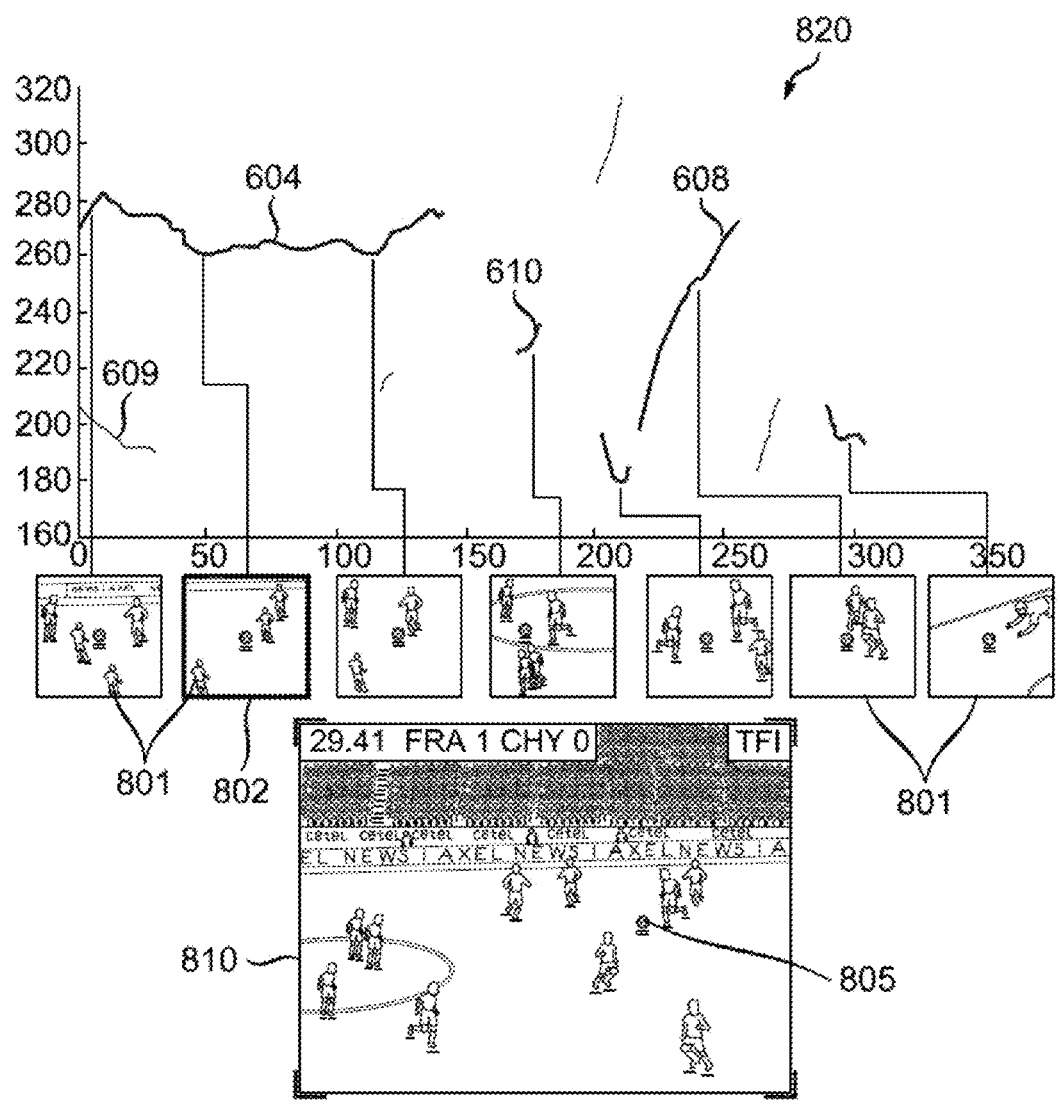
FIG. 8 is view of the user interface according to the invention.

FIG. 8 shows a user interface for the user to interact with the data. The user interface plot or trajectory view 820 on the top shows the candidate trajectories T, where as in FIG. 7 the X-axis represents the time in frames and the Y-axis the Euclidean distance between a candidate and top left pixel of the image. The thick trajectories 604, 608, 610 and the two other unlabelled trajectories represented by thick lines belong to BT at this moment in time. Below the plot there are a set of thumbnails 801, each one is associated to a trajectory of BT. The object 805 detected as the ball is centered in the thumbnail and surrounded by a circle (it is double underlined for clarity), so the user can quickly see if the trajectory is tracking the ball or not. When a thumbnail is selected, the frame of the selected thumbnail 802 appears in the bottom or select frame 810. The user can interact with the candidate objects by setting/unsetting them as the ball. The rectangles which are single underlined for clarity indicate a candidate and the circle indicates which candidate is selected as the ball. The circles and other markings can be markers which are part of the user interface which permit the user to associate objects in the thumbnails, with the objects in the thumbnails 801, the bottom or select frame 810 and the trajectories in the user interface plot 820.

The user does not want trajectories from $T_w$ to be part of BT. With this in mind two options are reasonable here. The first one is to remove all the trajectories in $T_w$ and the second one is to modify their confidence index to give them a bad score.

By removing all the trajectories from $T_w$ one guarantees that none of them will appear in BT. On the other hand, one is also eliminating the chance of a trajectory being trimmed and used to generate BT, even though the odds of this happening are low.

By giving to the trajectories of $T_w$ a negative value and modifying the algorithm to reject trajectories whose confidence index is lower than 0 one can avoid the problem of using trajectories from $T_w$ to build BT. If during the process of generating BT some trajectories from $T_w$ are trimmed in a way that the candidate classified as wrong is removed, the trajectories can become part of BT. The confidence index can become positive after the wrong candidates are removed.

Figure 9:
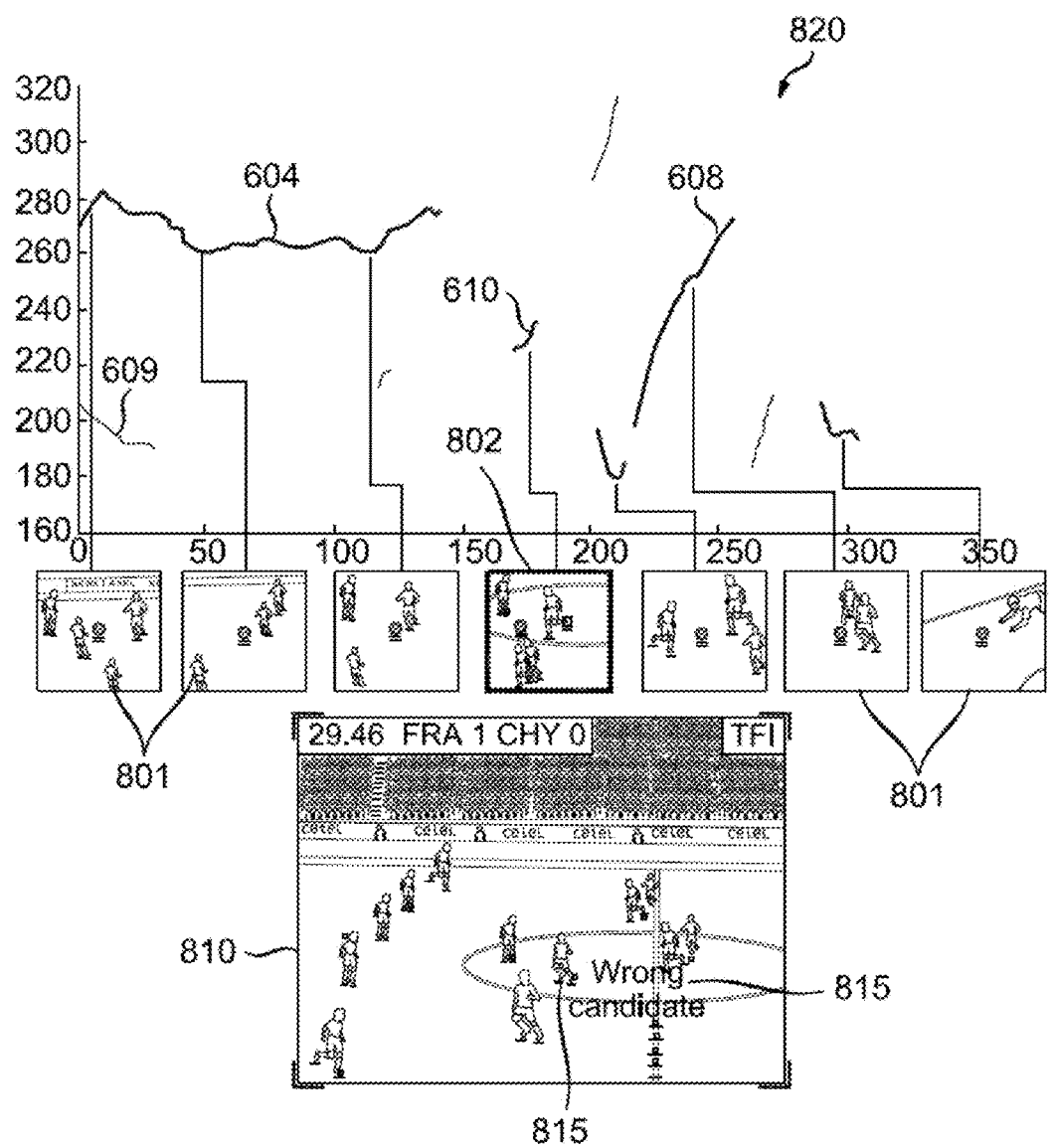
FIG. 9 is another view of the user interface according to the invention.

FIG. 9 shows the interface again. Here, the selected thumbnail 802 contain wrong trajectory 610. Here the frame is displayed in the bottom 810 of the interface. By clicking on candidate, a contextual menu 815 appears on the screen and the user can select it as a wrong candidate as shown in FIG. 9.

This will lower the confidence index of all the trajectories containing the wrong candidate and BT will be recomputed again.

The system has a pre-established model of the ball that is used to generate the set of candidates. Eccentricity, size and color are some elements of the model as described above.

With minor modifications, the system can benefit from the user input in order to update the model of the ball. For example, each time the user sets a ball candidate as a good ball candidate, the parameters of the model can be modified to better match the new ones.

Figure 10:
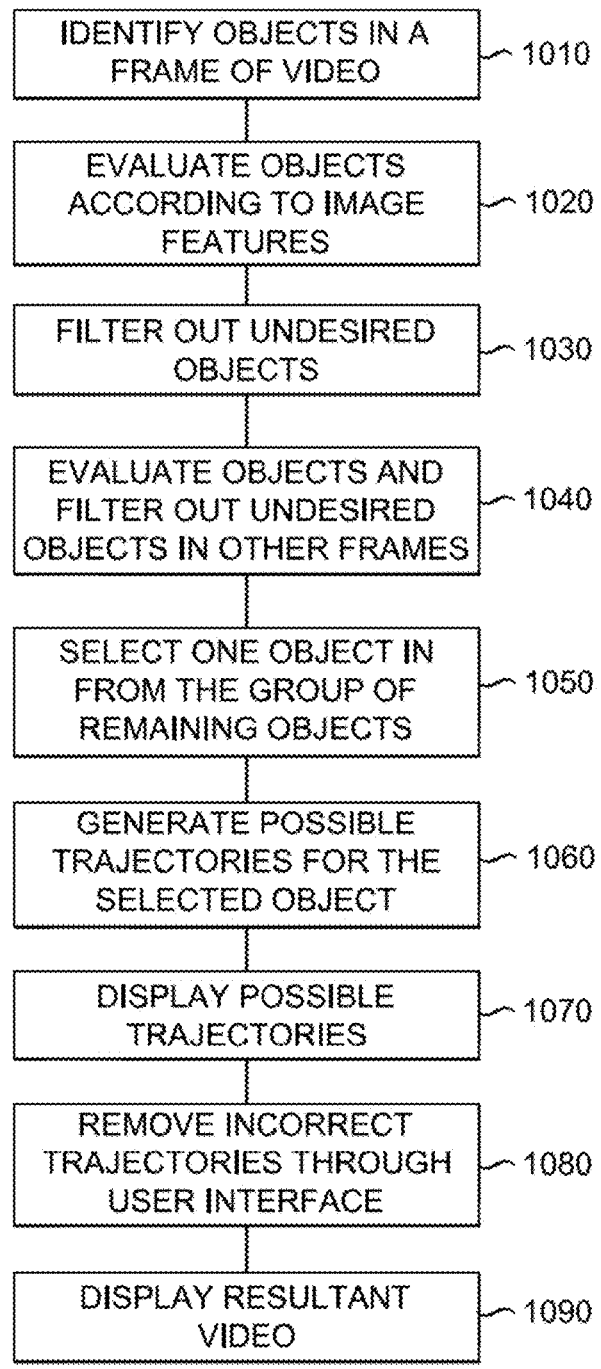
FIG. 10 is a flowchart of a trajectory-based ball detection and display method according to the invention.

The invention can be a method as shown in the flow chart in FIG. 10. The method can include the step 1010 of identifying sets of connected components in a video frame which are part of a video sequence. The connected components can be pixels of a ball or pixels of some other object such as a shoe. Then step 1020 can be employed which can evaluate each of the sets of connected components with regard to at least one image feature, wherein the image features can be area, eccentricity, or whiteness. Step 1030 then compares the at least one image feature of each of the sets of connected components to predetermined criteria to produce a filtered list of connected components, wherein this step can involve the application of steps 120 and 130 in FIG. 1, can use some luminance value or chrominance values of a frame as the predetermined criteria, and involve filtering out background. Step 1040 now performs the same repeating, identifying, evaluating, and comparing steps in other contiguous frames. Step 1050 involves selecting one of the connected components. Step 1060 then generates a set of candidate trajectories of the selected connected component (i.e. object of interest) be generated across multiple frames. Step 1070 is a displaying step in which the candidate trajectories of the selected connected components are shown to a user in which the method can incorporate a user interface that permits the user to see trajectories on a chart, plot or the like. Step 1080 is a step in which the user can remove specific candidate trajectories of the selected connected components through the user interface through some input provided by the user. In at least one embodiment, the user does not directly remove trajectories, but rather gives feedback to the application in this step indicating that a candidate is the ball or not. In this removing step, the user is essentially identifying wrong candidates such that these candidates will not be included in BT. Step 1090 is a step in which final images of the video sequence are displayed responsive to the selecting and removing steps, where in the final images can selected portions of original video which improves the visibility of the desired object and its trajectory. A selected portion could be close-ups, cropped portion or zoomed portions. Improved visibility could include centering of the desired object or removal of frames which may not have the object.

Figure 11:
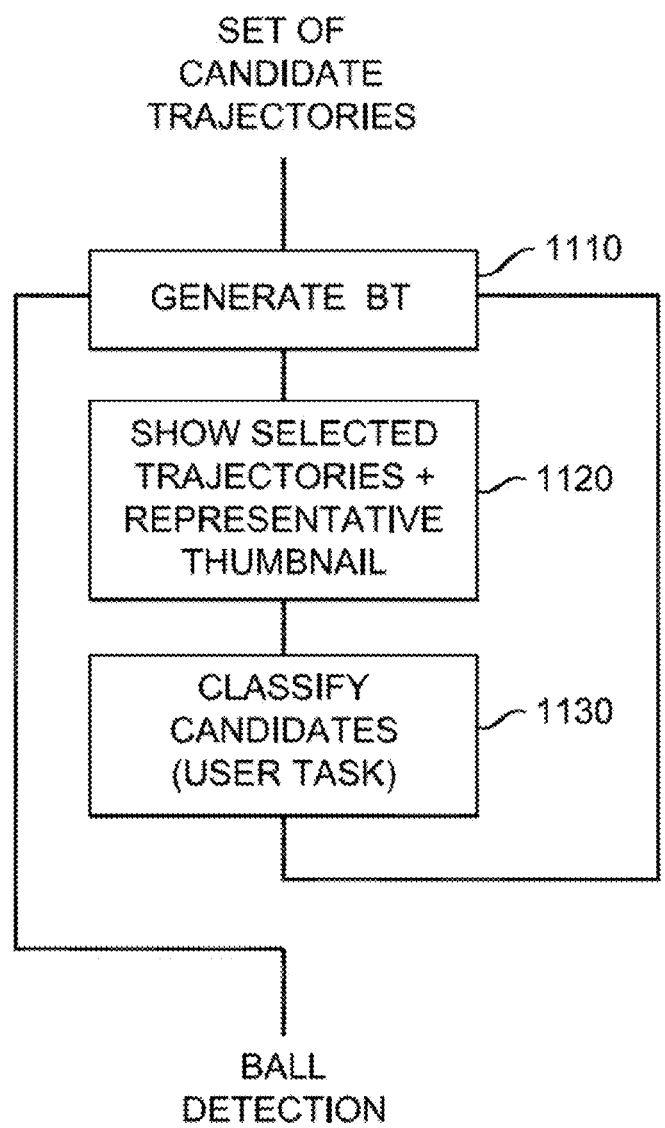
FIG. 11 is a flowchart of a trajectory-based ball detection method according to the invention.

The features of the invention can further be appreciated from FIG. 11 in which the set BT can be created in an algorithm in step 1110. In step 1120, the trajectories in BT are shown and selected in a user interface which can incorporate thumbnail views and a trajectory. In step 1130, the trajectories can be classified as good candidates (being the ball) or wrong candidates (not being the ball). Step 1110 can also be a reformulation step of BT, in which BT is reformulated responsive to the step 1130 to obtain an improved BT. Steps 1110, 1120, and 1130 can be repeated until BT no longer changes, thereby permitting detection of the object such as a ball. In an embodiment of the invention thumbnails can be a running video of the candidate trajectory.

While the present invention has been described in terms of a specific embodiment, it will be appreciated that modifications may be made which will fall within the scope of the invention. For example, various processing steps may be implemented separately or combined, and may be implemented in general purpose or dedicated data processing hardware or in software, and thresholds and other parameters may be adjusted to suit varying types of video input.

The invention claimed is:

1. A method comprising:
identifying sets of connected components in a video frame of a video sequence;
displaying alternate trajectories of selected connected components through a user interface;
removing at least one alternate trajectory of the selected connected components responsive to a user interface input, wherein the user specifically classifies the at least one alternate trajectory as a wrong candidate and the at least one alternate trajectory is removed;
generating a confidence level for the alternate trajectories belonging to the selected connected components, wherein the at least one alternate trajectory classified as a wrong candidate by the user is excluded from being one of the alternate trajectories belonging to the selected connected components for which the generated confidence level is generated;
eliminating alternate trajectories having a confidence level below a predetermined value and the at least one alternate trajectory classified as a wrong candidate by the user to remove; and
displaying images of said video sequence responsive to the removing, generating, and eliminating.

2. The method of claim 1 comprising:
evaluating each of said sets of connected components with regard to at least one image feature;
comparing the at least one image feature of each of said sets of connected components to predetermined criteria to produce a filtered list of connected components;
repeating said identifying, evaluating, and comparing for contiguous frames;
selecting one of the connected components; and
generating a set of alternate trajectories of the selected connected components across multiple frames for the displaying.

3. The method of claim 2 wherein said identifying sets of connected components comprises processing an image of said video sequence to create an image representing local maxima.

4. The method of claim 2 wherein said criteria comprises distance to the closest alternate, distance to the edge of the field, or the number of alternates inside the same connected component within a binary object mask.

5. The method of claim 2 wherein said evaluating said alternate trajectories to determine a selected trajectory comprises: identifying pairs of connected components, wherein one component of the pair is in the first image and one component of the pair is in the subsequent image, and wherein the distance between the locations of the two connected components in the pair is below a predetermined distance threshold.

6. The method of claim 2 wherein said evaluating said alternate trajectories to determine a selected trajectory comprises: evaluating the length of the trajectory, the characteristics of the connected components that compose the trajectory, and the number of unsupported points in the trajectory.

7. The method of claim 2 wherein said processing images in said video sequence based at least in part upon said selected trajectory comprises highlighting the object moving along the selected trajectory.

8. The method of claim 2 wherein the user interface employs thumbnail views of a plurality of frames, indicators in the thumbnail views highlighting the selected connected components, and trajectory view for displaying the alternate trajectories, wherein the indicators correlates specific trajectories to specific selected connected components.

9. The method of claim 2 further comprising processing an image of said video sequence to create a binary image representing local maxima, wherein the processing comprises convolving the luminance component of the image with a kernel.

10. The method of claim 9 wherein the kernel is a normalized Gaussian kernel.

11. The method of claim 2 wherein the at least one image feature comprises area, eccentricity, or whiteness.

12. The method of claim 11 wherein the user interface employs a trajectory view representing alternate trajectories as a function of frame time.

13. The method of claim 11 wherein the user interface employs thumbnail views of a plurality of frames and indicators in the thumbnail views highlighting the selected connected components.

14. The method of claim 13 wherein the thumbnail is a running video of an alternate trajectory.

15. The method of claim 13 wherein the user interface employs an additional indicator correlating the selected connected components in the thumbnail views to one of the alternate trajectories in the trajectory view.

16. The method of claim 15 further comprising classifying alternate trajectories of the selected connected components in the removing through the user interface, wherein the user interface employs a contextual menu for classification of the alternate trajectories.

* * * * *